US012199331B2

(12) United States Patent
Kong et al.

(10) Patent No.: US 12,199,331 B2
(45) Date of Patent: Jan. 14, 2025

(54) LAMINATED GLASS ANTENNA STRUCTURE

(71) Applicants: HYUNDAI MOTOR COMPANY, Seoul (KR); KIA CORPORATION, Seoul (KR); Hongik University Industry—Academia Cooperation Foundation, Seoul (KR)

(72) Inventors: Nak Kyoung Kong, Seongnam-si (KR); Dae Hee Lee, Incheon (KR); Jong Min Park, Seoul (KR); Ki Hong Lee, Seoul (KR); Jong Seon Lee, Suwon-si (KR); Oh Heon Kwon, Anyang-si (KR); Keum Cheol Hwang, Seoul (KR); Ho Sung Choo, Seoul (KR)

(73) Assignees: HYUNDAI MOTOR COMPANY, Seoul (KR); KIA CORPORATION, Seoul (KR); Hongik University Industry-Academia Cooperation Foundation, Seoul (KR)

( * ) Notice: Subject to any disclaimer, the term of this patent is extended or adjusted under 35 U.S.C. 154(b) by 134 days.

(21) Appl. No.: 18/086,940

(22) Filed: Dec. 22, 2022

(65) Prior Publication Data

US 2024/0047850 A1 Feb. 8, 2024

(30) Foreign Application Priority Data

Aug. 5, 2022 (KR) ........................ 10-2022-0097631

(51) Int. Cl.
*H01Q 1/12* (2006.01)
*H01Q 1/48* (2006.01)
(Continued)

(52) U.S. Cl.
CPC ............. *H01Q 1/1285* (2013.01); *H01Q 1/48* (2013.01); *H01Q 9/0457* (2013.01); *H01Q 21/06* (2013.01)

(58) Field of Classification Search
CPC ...... H01Q 1/1285; H01Q 1/48; H01Q 9/0457; H01Q 21/06; H01Q 9/40; H01Q 15/006;
(Continued)

(56) References Cited

U.S. PATENT DOCUMENTS

| | | | |
|---|---|---|---|
| 6,424,298 | B1 | 7/2002 | Nishikawa et al. |
| 2006/0152421 | A1 | 7/2006 | Baranski |

(Continued)

FOREIGN PATENT DOCUMENTS

| | | | |
|---|---|---|---|
| JP | H05218719 | A | 8/1993 |
| JP | 2001111332 | A | 4/2001 |

(Continued)

*Primary Examiner* — David E Lotter
(74) *Attorney, Agent, or Firm* — Lempia Summerfield Katz LLC

(57) ABSTRACT

A laminated glass antenna structure includes: a lower glass sheet including a first surface facing inside and a second surface at the upper end thereof; an upper glass sheet including a third surface adjacent to the lower glass sheet; an adhesive film positioned between the upper glass sheet and the lower glass sheet; and an antenna unit including a plurality of microstrip patch unit cells provided on the second surface and the third surface with respect to a ground plane provided on the first surface.

17 Claims, 5 Drawing Sheets

(51) Int. Cl.
*H01Q 9/04* (2006.01)
*H01Q 21/06* (2006.01)

(58) Field of Classification Search
CPC .. H01Q 1/38; H01Q 1/22; H01Q 1/36; H01Q 9/0407; H01Q 1/325; H01Q 13/08
See application file for complete search history.

(56) References Cited

U.S. PATENT DOCUMENTS

| | | | | |
|---|---|---|---|---|
| 2016/0344093 | A1* | 11/2016 | Tagi | H01Q 1/525 |
| 2021/0175628 | A1* | 6/2021 | Dai | H01Q 9/0457 |
| 2023/0208009 | A1* | 6/2023 | Prabhu Gaunkar | H01Q 9/0457<br>361/748 |

FOREIGN PATENT DOCUMENTS

| | | | |
|---|---|---|---|
| KR | 20110089827 | A | 8/2011 |
| KR | 101945397 | B1 | 2/2019 |
| WO | 2018199753 | A1 | 11/2018 |

* cited by examiner

LAMINATED GLASS ANTENNA STRUCTURE

CROSS-REFERENCE TO RELATED APPLICATION

This application claims, under 35 U.S.C. § 119(a), the benefit of and priority to Korean Patent Application No. 10-2022-0097631, filed on Aug. 5, 2022, the entire contents of which are incorporated herein by reference.

BACKGROUND

(a) Technical Field

The present disclosure relates to a laminated glass antenna structure. More particularly, it relates to a laminated glass sheet including a printed antenna unit in consideration of reflection coefficient, efficiency, and gain in the state of including a plurality of microstrip patch unit cells.

(b) Background Art

Recently, the demand for automobiles has been explosively increasing, as Korea is in the era of "one car for every two people." As the demand for automobiles increases and the number of actual automobiles increases, the number of traffic accidents also increases proportionally.

However, driver carelessness is a major cause of such traffic accidents, and wireless access in vehicular environments (WAVE) communication is emerging as a way to reduce traffic accidents caused by driver carelessness. WAVE is a next-generation vehicle communication environment and is a very important element in high-speed vehicle-to-vehicle (V2V) communication and vehicle-to-infrastructure (V2I) communication.

Furthermore, fifth-generation (5G) communication technology has recently been spotlighted for the purpose of improving travel environment by collecting a large amount of data such as travel information on other vehicles, surrounding traffic information, and pedestrian information. When an antenna for communication is mounted on a vehicle, glass antenna technology of printing an antenna pattern on a windshield glass is used in order to minimize the additional space for mounting the antenna and maintain aesthetics of the vehicle. However, because a current glass antenna is designed for amplitude modulation (AM) and frequency modulation (FM) reception, a new antenna design technology for 5G bands is needed.

Experiments to apply such WAVE communication technology to a vehicle and experiments to implement the same in a large vehicle such as a bus on a highway are actively being conducted. Such WAVE communication may be implemented using a shark antenna installed in a general passenger car, but because such an antenna is installed outside the vehicle, installation is difficult, and the installation structure is complicated.

The above information disclosed in this Background section is only for enhancement of understanding of the background of the disclosure. Therefore, this Background section may contain information that does not form the prior art that is already known to a person of ordinary skill in the art.

SUMMARY OF THE DISCLOSURE

The present disclosure has been made in an effort to solve the above-described problems associated with the prior art.

It is an object of the present disclosure to provide an antenna unit including microstrip patch unit cells located partially between an upper glass sheet and a lower glass sheet.

Another object of the present disclosure is to provide a laminated glass antenna structure including an antenna unit with optimized size including microstrip patch unit cells.

The objects of the present disclosure are not limited to the above-mentioned objects. Other objects of the present disclosure not mentioned herein may be understood based on the following description, and may be understood more clearly through embodiments of the present disclosure. The objects of the present disclosure may be realized by means and combinations thereof indicated in the claims.

In one aspect, the present disclosure provides a laminated glass antenna structure, the structure including: a lower glass sheet including a first surface facing inside and a second surface at the upper end thereof; an upper glass sheet including a third surface adjacent to the lower glass sheet; an adhesive film positioned between the upper glass sheet and the lower glass sheet; and an antenna unit including a plurality of microstrip patch unit cells provided on the second surface and the third surface with respect to a ground plane provided on the first surface.

In an embodiment, the antenna unit may include: a patch unit including a plurality of unit cells provided along the outer edges of the upper glass sheet and the lower glass sheet; and an element unit provided at the inner side of the patch unit.

In another embodiment, the element unit may include: a first feeding line provided in the widthwise direction of the upper glass sheet; a second feeding line provided between the first feeding line and a feeding portion; and radiation elements each spaced apart from the first feeding line to have a predetermined gap therebetween.

In another embodiment, the radiation elements may be positioned at upper and lower ends with respect to the first feeding line and have regular intervals therebetween.

In another embodiment, the radiation elements positioned at one end with respect to the first feeding line may each have an interval from a radiation element adjacent thereto that is identical to the wavelength of a corresponding frequency.

In another embodiment, the first feeding line and the radiation elements may have a gap therebetween of 0.05 wavelength or less of a corresponding frequency.

In another embodiment, the radiation elements may have a length of 0.4 to 0.6 wavelength of a corresponding frequency, and the radiation elements may have a width of 0.1 wavelength or less of a corresponding frequency.

In another embodiment, a microstrip patch unit cell printed on the third surface may include: a first patch body having a square shape located at the central portion of the antenna unit; and two first extensions spaced apart from each other and extending outwardly from every one of four sides of the first patch body.

In another embodiment, a microstrip patch unit cell printed on the second surface may include: a second patch body having a shape corresponding to the first patch body; second extensions each extending from a corresponding side of the second patch body and corresponding to the gap between the two first extensions positioned on one side of the first patch body; and third extensions each corresponding to the position between two adjacent first extensions each extending from a corresponding one of two adjacent sides of the first patch body.

In another embodiment, a microstrip patch unit cell may have a square shape with one side having a length of 1.4 to 1.6 millimeters (mm).

In another embodiment, the gap between the two first extensions on one side of the first patch body may be 0.1 times the length of one side of the microstrip patch unit cell.

In another embodiment, the first patch body may have one side having a length that is 0.46 times the length of one side of the microstrip patch unit cell.

In another embodiment, each first extension may have a thickness that is 0.13 times the length of one side of the microstrip patch unit cell.

In another embodiment, the distance between an end of each first extension and an end of the microstrip patch unit cell may be 0.03 times the length of one side of the microstrip patch unit cell.

In another embodiment, each second extension may have a thickness equal to the gap between the two first extensions provided on one side of the first patch body.

In another embodiment, the gap between each second extension and each third extension adjacent thereto may be equal to a thickness of each first extension.

In another embodiment, each third extension may have one side having a length that is 0.26 times the length of one side of the microstrip patch unit cell.

In another embodiment, the microstrip patch (of the microstrip patch unit cells) may have an electromagnetic band gap (EBG) structure.

Other aspects and embodiments of the disclosure are discussed below.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
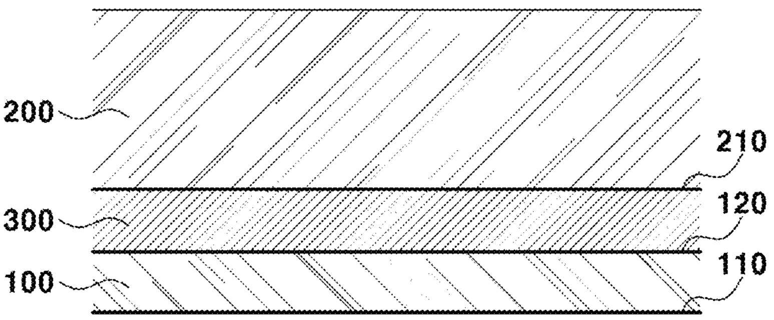
FIG. 1 illustrates a cross-sectional view of a laminated glass sheet according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, may be determined in part by the particular intended application and usage environment.

In the figures, the reference numbers refer to the same or equivalent parts of the present disclosure throughout the several figures of the drawing.

DETAILED DESCRIPTION

Hereinafter, embodiments of the present disclosure are described in detail with reference to the accompanying drawings. Embodiments of the present disclosure may be modified into various forms, and the scope of the present disclosure should not be construed as being limited to the following embodiments. Embodiments are provided to more completely explain the present disclosure to those having ordinary skill in the art.

Terms such as ". . . line," ". . . unit," ". . . glass," and the like, as used in this specification, each refer to a unit that processes at least one function or operation and may be implemented as hardware or software or a combination of hardware and software.

In the present specification, the names of the components are divided into "first," "second," and so on, in order to distinguish therebetween because the names of the components are the same.

As a description for explaining the direction in the present specification, the longitudinal direction has the same meaning as the height direction based on the drawings.

In the present specification, "corresponding frequency" may refer to an operating frequency of 27 to 29 gigahertz (GHz).

In this specification, a patch unit and a microstrip patch unit cell may be interpreted as having the same meaning.

Hereinafter, embodiments are described in detail with reference to the accompanying drawings, and in the description given with reference to the accompanying drawings, the same or corresponding components are assigned the same reference numerals, and a description thereof is not repeated.

Figure 2:
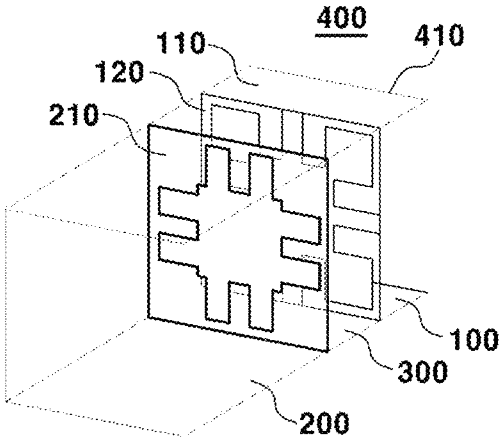
FIG. 2 is a perspective view of a laminated glass sheet including a microstrip patch unit cell according to an embodiment of the present disclosure.

FIG. 1 illustrates a cross-sectional side view of a windshield glass including a laminated glass antenna structure of the present disclosure. FIG. 2 illustrates a perspective view of a unit cell 410 having an antenna structure.

As illustrated in the drawing, the laminated glass antenna structure includes: an upper glass sheet 200; a lower glass sheet 100; and an antenna unit 400 including a plurality of microstrip patch unit cells 410 and positioned between the upper glass sheet 200 and the lower glass sheet 100. The laminated glass antenna structure further includes an adhesive film 300 positioned between the microstrip patch unit cells 410 constituting the antenna unit 400. The adhesive film 300 may be made of a polyvinyl butyral film (PVB). The upper glass sheet 200 and the lower glass sheet 100 may be made of soda-lime glass, and the upper glass sheet 200 and the lower glass sheet 100 may have the same or different thicknesses.

In one embodiment of the present disclosure, the upper glass sheet 200 may have a thickness of 2.0 to 2.2 millimeters (mm), and the lower glass sheet 100 may have a thickness of 0.67 to 0.74 mm. The adhesive film 300 may have a thickness of 0.72 to 0.80 mm.

The microstrip patch unit cells 410 constituting the antenna unit 400 may be printed on one surface of the upper glass sheet 200 and one surface of the lower glass sheet 100. The microstrip patch unit cells 410 may also have a structure in which the microstrip patch unit cells 410 are printed on the lower glass sheet 100 and the upper glass sheet 200 with the ground plane located on the rear surface of the lower glass sheet 100 as a base. The microstrip patch (of the microstrip patch unit cells 410) may be a patch in which an electromagnetic band gap (EBG) structure is adopted.

The EBG structure has the most basic form of a square conductor patch etched on a dielectric material having a conductor ground plane. The EBG structure includes a Sievenpiper structure or a mushroom-shaped structure. Each patch is connected to the ground plane using a via in the central portion thereof, which may serve as a parallel inductor. Each patch is periodically arranged in two-dimension on the plane of a substrate while maintaining the dielectric spacing so as to form a series capacitor. Therefore, such an EBG structure may be represented as a parallel resonant (LC) circuit.

The upper glass sheet 200 includes a third surface 210 facing the adhesive film 300, and another surface facing outside. The microstrip patch unit cell 410 printed on the third surface 210 may include: a first patch body 411 having a square shape located at the central portion of the patch unit cell 410; and two first extensions 412 spaced apart from each other and extending outwardly from every one of four sides of the first patch body 411.

The lower glass sheet 100 includes a first surface 110 facing inside, and a second surface 120 facing the adhesive film 300. Furthermore, the first surface 110 of the lower glass sheet 100 serves as a ground plane. The lower glass sheet 100 has the second surface 120 on which the microstrip patch unit cell 410 is printed. The microstrip patch unit cell 410 printed on the lower glass sheet 100 may correspond to the microstrip patch unit cell 410 printed on the third surface 210. The microstrip patch unit cell 410 printed on the second surface 120 may include: a second patch body 413 having a shape corresponding to the first patch body 411; second extensions 414, each extending from a corresponding side of the second patch body 413 and corresponding to a gap between the two first extensions 412; and third extensions 415 each corresponding to a position between two adjacent first extensions 412 each extending from a corresponding one of two adjacent sides of the first patch body 411.

The antenna unit 400 is a thin conductive film having a mesh structure, which may be a metal film made of copper, nickel, aluminum, gold, silver, or a conductive paste film containing fine metal particles or a carbon paste film. The fine mesh pattern of the antenna unit 400 may be formed using a method of photo etching a thin metal film provided on one surface of the upper glass sheet 200 or the lower glass sheet 100, etching with printing resist, or printing conductive resin paste.

When the pattern of the microstrip patch unit cells 410 is formed by photo etching, a photoresist film is formed on the metal film, exposed using a photomask, and developed using a developer so as to form the antenna pattern of the resist film. The antenna pattern of the resist film is etched using an etchant, and the resist film is peeled and removed to form an antenna pattern made up of ultrafine metal wires.

In the method of etching with printing resist, the antenna pattern of the resist film is printed on the metal film by screen printing, gravure printing, inkjet printing, or the like. A portion of the metal film other than the resist coated portion is etched using an etchant and the resist film is peeled off to form an antenna pattern of a metal film.

In the method of conductive paste printing, the antenna pattern is printed on transparent glass sheet with a conductive paste, carbon paste, or the like containing metal particles so as to form a conductive antenna pattern.

When the surface of the ultrafine metal wire having the mesh pattern is treated to have low reflectivity, the reflection color of the metal is suppressed, and the transparent antenna becomes invisible. Accordingly, visibility increases when looking out of the car through the mesh pattern.

Specific examples of low reflectivity treatments may be surface treatments such as chemical conversion treatment and plating treatment. The chemical conversion treatment forms a low-reflectivity layer on the surface of a metal by oxidation treatment and sulfurization treatment. For example, when copper is used for the material of the ultrafine metal wire and the surface thereof is oxidized to form an oxide film, the surface of the metal wire may be made black to have anti-reflection properties without having to reduce the cross-sectional dimension of the ultrafine metal wire.

In the plating treatment, the ultrafine metal wire is plated with black chrome, so that the surface of the ultrafine metal wire is made black having anti-reflection properties. When copper plating with high current density is applied, the ultrafine metal wire may have a dark brown color.

Figure 3:
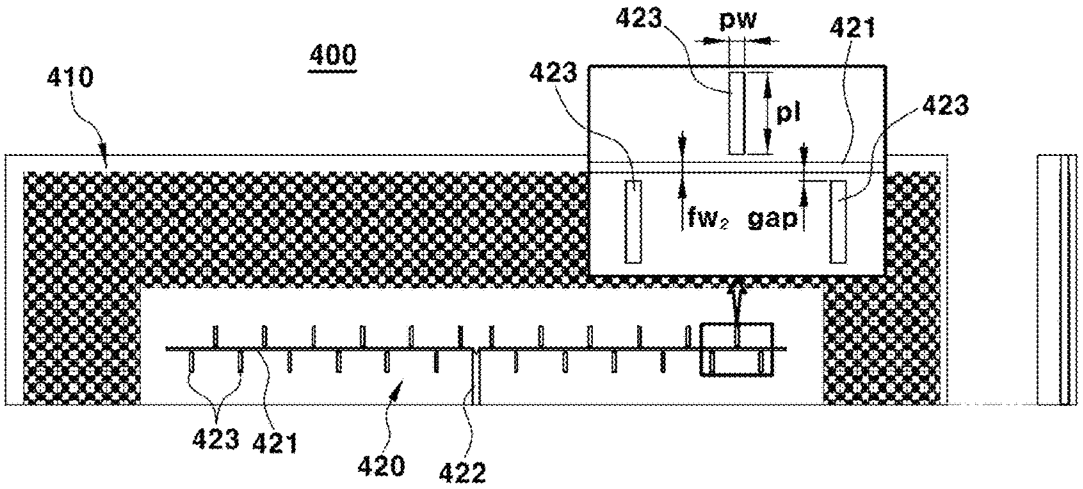
FIG. 3 illustrates a front view of a laminated glass sheet including an antenna unit according to an embodiment of the present disclosure.

FIG. 3 illustrates the structure of the antenna unit 400 including the patch unit 410 and an element unit 420 positioned on the laminated glass sheet, as an embodiment of the present disclosure.

Because the patch unit 410 is made up of the microstrip patch unit cells 410 as illustrated in the drawing, the patch unit 410 may form at least one row along the outer edge of the windshield glass. In an embodiment of the present disclosure, the patch unit 410 may be referred to as the microstrip patch unit cells 410.

The microstrip patch unit cells 410 may be printed on the third surface 210 of the upper glass sheet 200 and the second surface 120 of the lower glass sheet 100. The microstrip patch unit cell 410 printed on the third surface 210 includes the first patch body 411 having a rectangular shape located on the central portion of the unit cell 410. The first patch body 411 may have a square shape. The microstrip patch unit cell 410 printed on the third surface 210 further includes two first extensions 412 spaced apart from each other and extending outwardly from every one of four sides of the first patch body 411.

In comparison, the microstrip patch unit cell 410 located on the second surface 120 may have a shape corresponding to the microstrip patch unit cell 410 formed on the third surface 210. The second surface 120 may include the second patch body 413 corresponding to the first patch body 411, and the second extensions 414 and the third extensions 415 extending from the second patch body 413 and located at areas where the first extensions 412 are not located.

As such, the microstrip patch unit cells 410 located on the second surface 120 and the third surface 210 form a plurality of rows and surround at least a portion of the outer edge of the windshield glass. The antenna unit 400 includes the element unit 420 provided at a position closer to the inner side of the glass sheet compared to the outer edge of the windshield glass where the unit cell 410 is located.

The element unit 420 includes a first feeding line 421 positioned horizontally on the glass sheet, and a second feeding line 422 provided between the first feeding line 421 and a feeding portion. More specifically, the element unit 420 may include: the first feeding line 421 provided in the widthwise direction of the glass sheet; the second feeding line 422 perpendicular to the first feeding line 421 and provided between the first feeding line 421 and the feeding portion; and radiation elements 423 each spaced apart from the first feeding line 421 to have a predetermined gap therebetween. The second feeding line 422 has a thickness having a line impedance of 50 ohms in consideration of matching with the feeding portion. The first feeding line 421 has a thickness of 0.05 wavelength of the corresponding frequency in order to minimize line radiation.

The radiation elements 423 are positioned at upper and lower ends with respect to the first feeding line 421 in a direction perpendicular to the lengthwise direction of the first feeding line 421. The radiation elements 423 are positioned to alternate with each other in the vertical direction along the first feeding line 421.

The radiation elements 423 positioned in up and down directions along the first feeding line 421 may be spaced apart from the adjacent radiation elements 423 positioned in the same direction by an interval identical to the wavelength of the corresponding frequency. The radiation elements 423 are alternately arranged in up and down directions with respect to the first feeding line 421, and the radiation elements 423 positioned in each direction may have regular intervals therebetween.

Because the interval between the radiation elements 423 positioned in the same direction is identical to the wavelength of the corresponding frequency, the radiation elements 423 are positioned to have the same phase as the corresponding frequency so as to radiate the greatest power through constructive interference.

The radiation elements 423 may have a length of 0.4 to 0.6 wavelength of the corresponding frequency in the height direction of the cross section with respect to the first feeding line 421 and may have a width of 0.1 wavelength or less of the corresponding frequency. The radiation elements 423 having the length and width described above have the maximum gain at the corresponding frequency.

Because the first feeding line 421 and the radiation elements 423 are arranged to be spaced apart from each other by a predetermined gap, the gap between the first feeding line 421 and the radiation elements 423 may be 0.05 or less wavelength of the corresponding frequency. As such, the gaps between the radiation elements 423 and the first feeding line 421 are minimized to increase coupling power.

Figure 4:
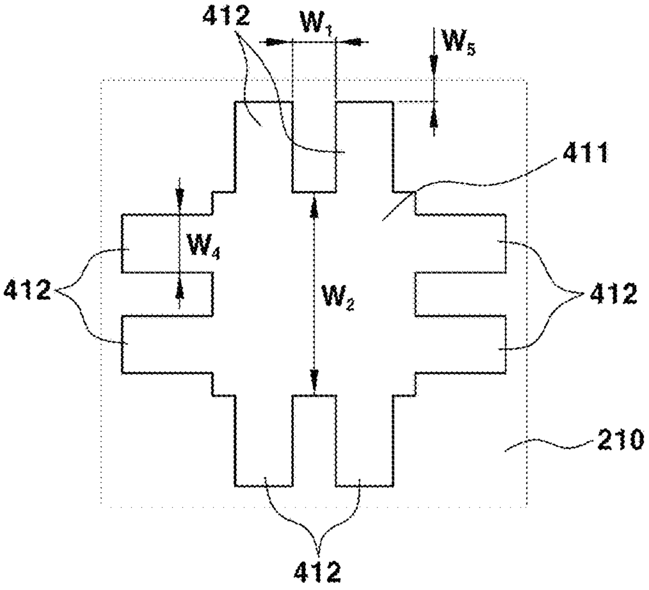
FIG. 4 illustrates a microstrip patch unit cell printed on a third surface according to an embodiment of the present disclosure.
Figure 5:
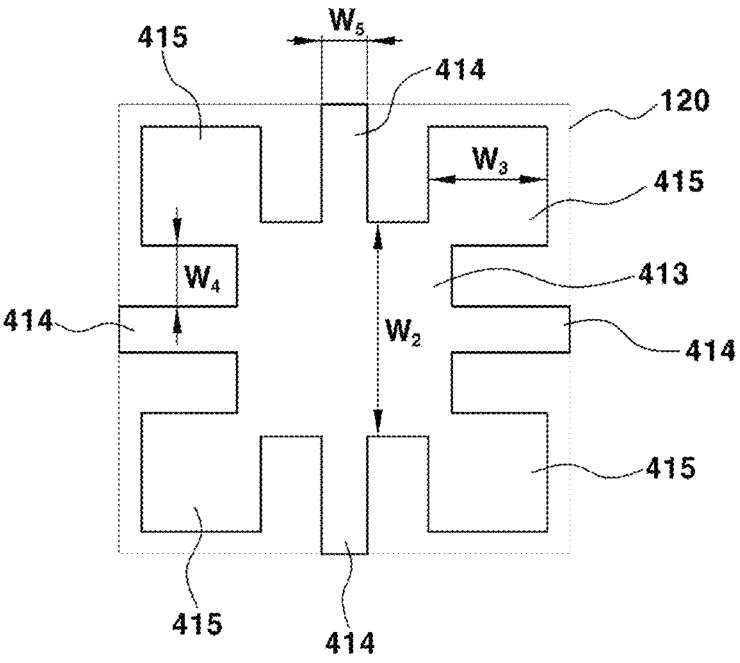
FIG. 5 illustrates a microstrip patch unit cell printed on a second surface according to an embodiment of the present disclosure.

FIG. 4 illustrates the microstrip patch unit cell 410 printed on the third surface 210 according to an embodiment of the present disclosure, and FIG. 5 illustrates the microstrip patch unit cell 410 printed on the second surface 120.

FIG. 4 illustrates the microstrip patch in the unit cell 410 positioned on the third surface 210 of the lower glass sheet 100.

The unit cell 410 including the microstrip patch of the present disclosure has a square shape with one side W having a length of 1.4 to 1.6 millimeters (mm). The microstrip patch includes: the first patch body 411 located in the central region of the unit cell 410; and the first extensions 412 each extending from the first patch body 411 to a position adjacent to a corresponding end of the unit cell 410.

The first patch body 411 has a rectangular cross section. More specifically, in an embodiment of the present disclosure, the first patch body 411 may have a square cross-sectional shape. The first extension 412 extends from the first patch body 411, having a rectangular cross section, to an area adjacent to the end of the unit cell 410. More specifically, each side of the first patch body 411 having a square cross-sectional shape may have a length W2 that is 0.46 times the one side of the unit cell 410.

The first extension 412 includes two first extensions extending from one side of the first patch body 411. The two first extensions 412 provided on one side of the first patch body 411 have a gap W1 therebetween, which is 0.1 times the length of one side of the microstrip patch unit cell 410. The first extension 412 may have a thickness W4 that is 0.13 times the length of one side of the microstrip patch unit cell 410. The end of the first extension 412 may have a distance W5 from the end of the unit cell 410, which is 0.03 times the length of one side of the microstrip patch unit cell 410.

As a structure corresponding to the third surface 210 in FIG. 4, FIG. 5 illustrates a microstrip patch unit cell 410 formed on the second surface 120 of the lower glass sheet 100.

As illustrated in the drawing, the microstrip patch formed on the second surface 120 includes: a second patch body 413 having a shape corresponding to the first patch body 411; second extensions 414 each corresponding to the gap between the two first extensions 412 formed on the third surface 210; and third extensions 415 each corresponding to the position between two adjacent first extensions 412 each extending from a corresponding one of two adjacent sides of the first patch body 411.

The second extensions 414 may each extend to be brought into contact with the end of the unit cell 410 adjacent thereto. The second extensions 414 have a width identical to the gap W1 between the two first extensions 412 provided on one side of the first patch body 411. The distance W4 between the second extensions 414 and the third extensions 415 adjacent thereto is equal to the thickness of the first extension 412. One side of a third extension 415 has a length W3 that is 0.26 times the length of one side of the microstrip patch unit cell 410.

In summary, the first extensions 412 are located on the third surface 210 in an embossed form, and the second extensions 414 and the third extensions 415 are located on the second surface 120 in the engraved form of the first extensions 412. As such, the third surface 210 and the second surface 120 have structures corresponding to each other.

Figure 6:
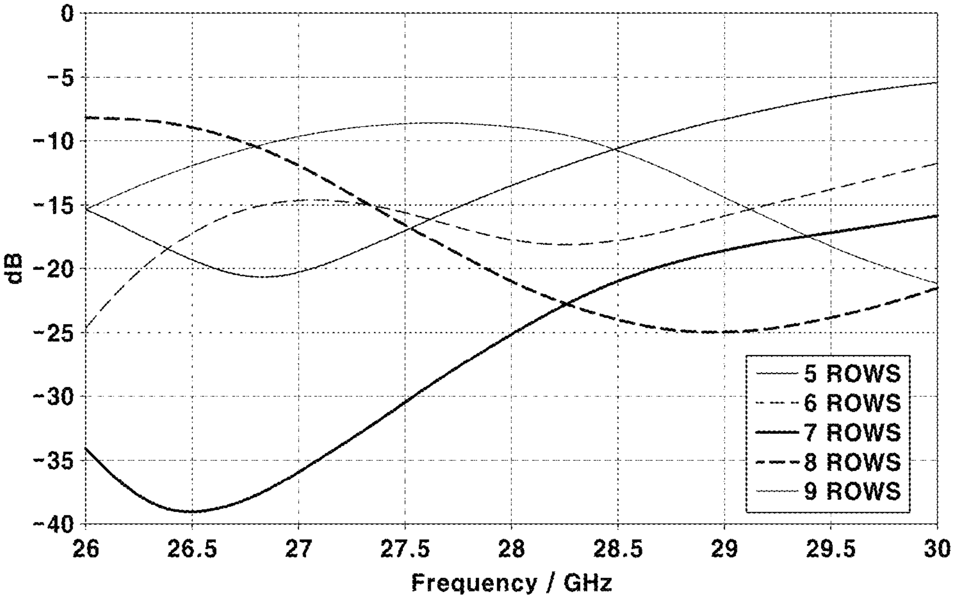
FIG. 6 shows transmission coefficient data depending on the arrangement of an antenna unit including a microstrip patch unit cell according to an embodiment of the present disclosure.

FIG. 6 shows transmission coefficient data on the glass sheet having the microstrip patch unit cells with different shapes of extensions.

Transmission coefficient refers to the ratio of a signal input to a system to a signal transmitted through the system and is usually expressed in decibels (dB). A transmission coefficient of −20 dB or less means that less than 1% of the power entering the system is transmitted and the rest is blocked, and the graph shows that the microstrip patch including the EBG structure of the present disclosure effectively blocks the signal in the corresponding frequency band.

When the microstrip patch unit cells 410 are arranged in 7 rows, the transmission coefficient has a maximum value of −27 dB at the corresponding frequency of 28 gigahertz (GHz). As illustrated in FIG. 3, when the unit cells 410 of the patch unit 410 are arranged in 7 rows along the outer edge of the windshield glass and surround the position adjacent to the edge of the windshield glass, the transmission coefficient has a maximum value (a negative maximum value).

Figure 7:
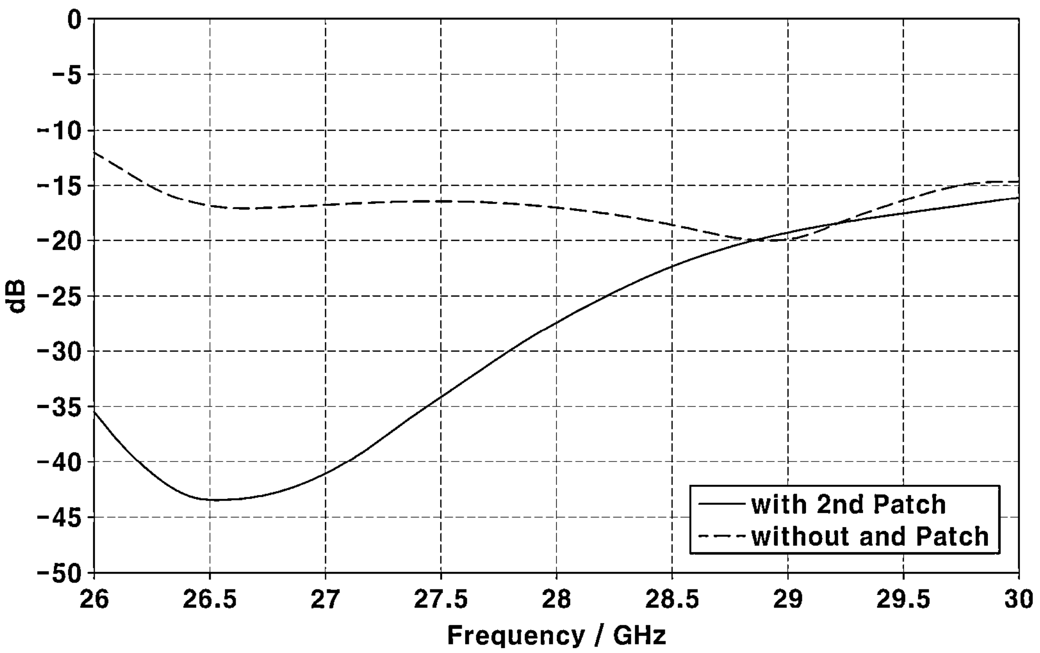
FIG. 7 shows transmission coefficient data depending on the arrangement of an antenna unit including a microstrip patch unit cell printed on a third surface according to an embodiment of the present disclosure.

Referring to FIG. 7, the antenna unit 400, including the microstrip patch unit cells 410, has a transmission coefficient of −27 dB when the unit cells 410 are arranged in 7 rows at a frequency of 28 GHz. The graph shows that the transmission coefficient increases by 10 dB from −27 dB to −17 dB depending on the presence or absence of the microstrip patch formed on the third surface 210. For this reason, having the microstrip patch on the third surface 210 is effective in improving the blocking performance of the unit cell 410. With this result, it is confirmed that the arrangement of the unit cells 410 in the EBG structure effectively blocks the surface wave.

Figure 8:
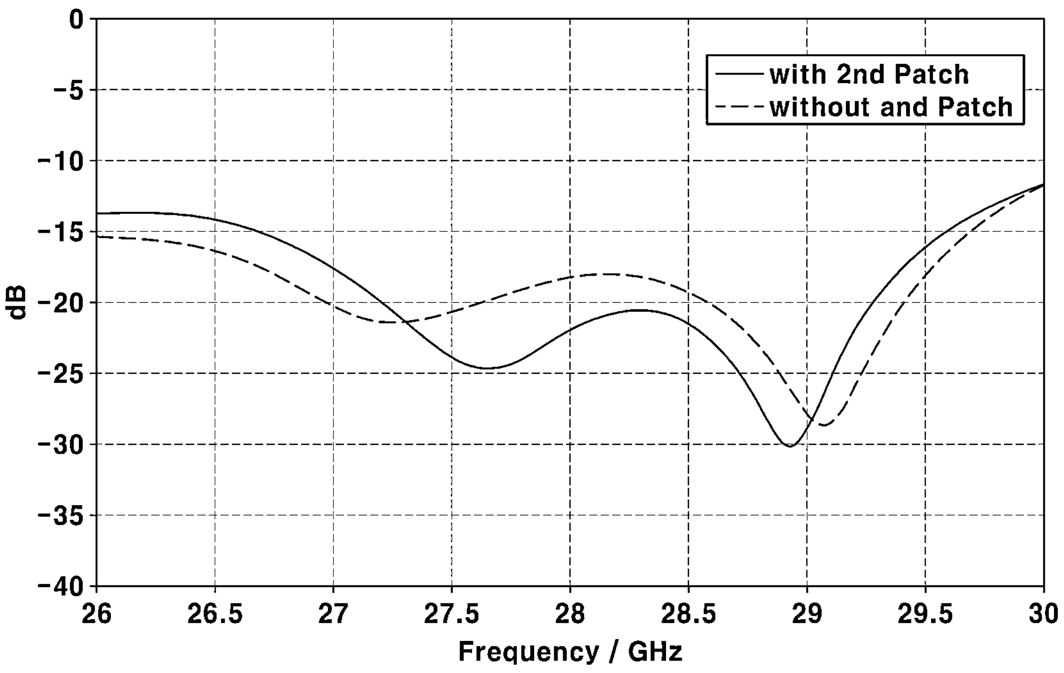
FIG. 8 shows reflection coefficient data on an antenna unit including a microstrip patch unit cell composed of electromagnetic band gap (EBG) elements according to an embodiment of the present disclosure.

FIG. 8 shows the reflection coefficient depending on whether the antenna unit 400, including the microstrip patch unit cells 410, has the EBG structure.

The reflection coefficient refers to the ratio of power that is reflected back to an input terminal when the signal is input to the system including the antenna.

The reflection coefficient of an antenna is expressed in dB. Generally, when the reflection coefficient is −10 dB or less at a corresponding frequency, more than 90% of the input power is delivered to the system and the antenna structure exhibits excellent performance.

Referring to FIG. 8, the antenna unit 400, including the microstrip patch unit cells 410, has a reflection coefficient value of −21 dB or less at a corresponding frequency of 28 GHz, and the antenna unit 400 in which the EBG structure is adopted satisfies a reflection coefficient of −17 dB or less. Therefore, the graph shows that the antenna designed on the laminated glass sheet operates normally at the corresponding frequency.

Figure 9:
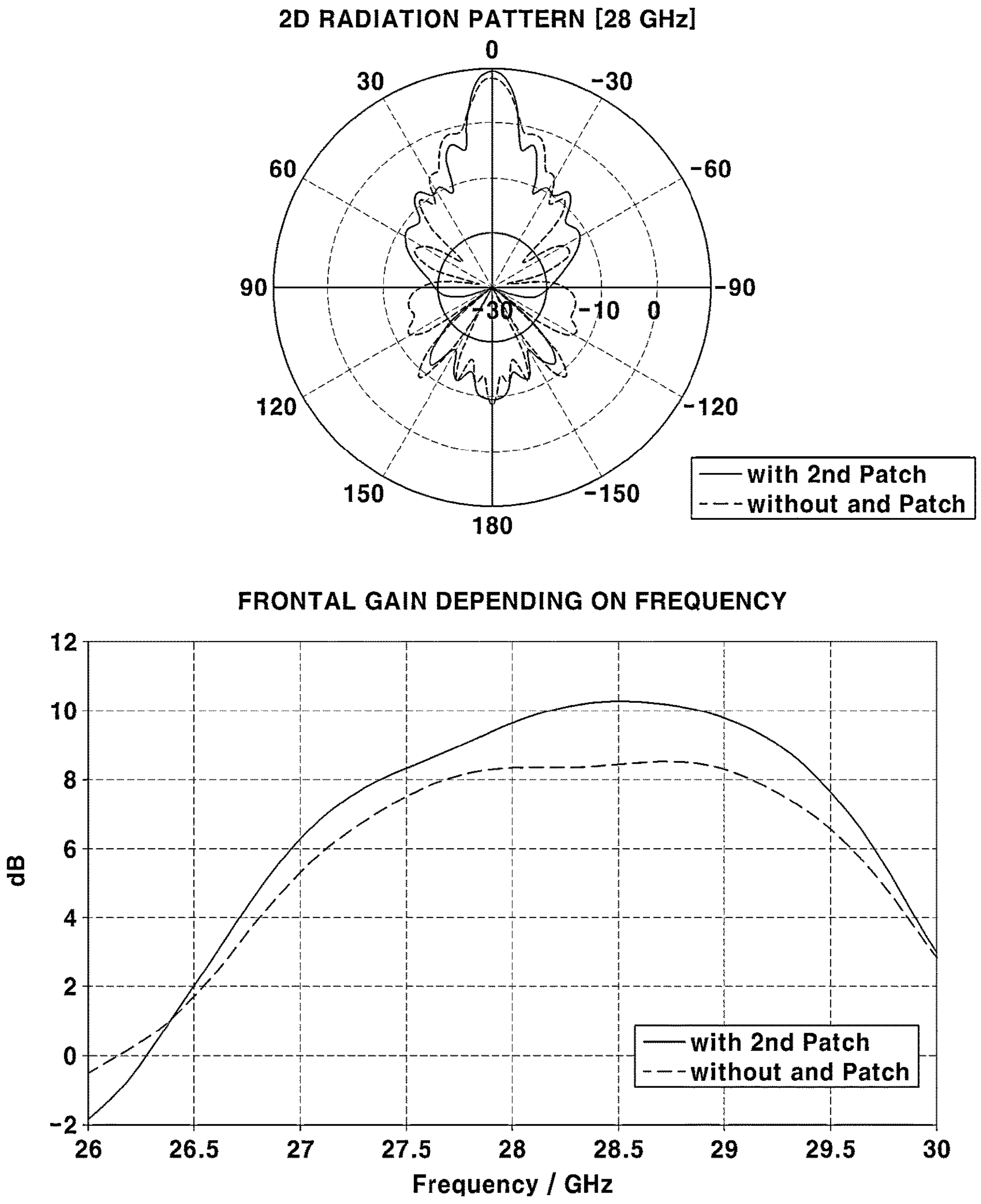
FIG. 9 shows frontal gain data on an antenna unit including a microstrip patch unit cell composed of EBG elements according to an embodiment of the present disclosure.

FIG. 9 shows a radiation pattern in a corresponding frequency band (28 GHz) and a frontal gain in the frequency band depending on whether the EBG structure is adopted in the antenna unit 400, including the microstrip patch unit cells 410, as an embodiment of the present disclosure.

The antenna, including the microstrip patch unit cells 410, may determine the radiation direction in a predetermined direction by adjusting the phase and radiation power of the radiation element. The radiation direction is predetermined based on the structure of the antenna unit 400, and the characteristics and frequency of the substrate (glass sheet) on which the patch unit cells 410 are located.

The gain of an antenna is usually expressed in decibels relative to isotrope (dBi), which is the ratio of the power radiated by the antenna in a predetermined direction to the power radiated by an ideal isotropic antenna.

Referring to FIG. 9, the frontal gain of the antenna, including the microstrip patch unit cells 410, satisfies 8 dBi or more at 28 GHz, and 9 dBi or more in the antenna unit 400 in which the EBG structure is adopted. This means that when EBG is adopted, the antenna unit 400 radiates up to 8 times more power than an ideal isotropic antenna. Accordingly, it is confirmed that the radiation pattern also has high directivity in the front direction.

As is apparent from the above description, the present disclosure can obtain the following effects by the configuration, combination, and operation relationship described above with the present embodiment.

The present disclosure provides an antenna unit including microstrip patch unit cells printed on at least one surface of an upper glass sheet and a lower glass sheet to thereby provide a highly secure antenna structure provided only at a portion of the glass sheet.

The present disclosure provides an antenna that satisfies the antenna radiation gain of the mm Wave band using an antenna unit including an optimized microstrip patch unit cell.

The detailed description is merely illustrative of the present disclosure. The above description shows and describes embodiments of the present disclosure, but the present disclosure can be used in various other combinations, modifications, and environments. Changes or modifications are possible within the scope of the idea of the disclosure disclosed herein, the scope of equivalents to the described disclosure, and/or the scope of ordinary skill or knowledge in the art. The described embodiments describe the best state for implementing the technical idea of the present disclosure, and various changes required for specific application fields and uses of the present disclosure are possible. Therefore, the detailed description of the present disclosure is not intended to limit the present disclosure to the disclosed embodiments. Also, the appended claims should be construed to include other embodiments.

What is claimed is:

1. A laminated glass antenna structure comprising:
- a lower glass sheet comprising a first surface facing inside and a second surface at an upper end thereof;
- an upper glass sheet comprising a third surface adjacent to the lower glass sheet;
- an adhesive film positioned between the upper glass sheet and the lower glass sheet;
- an antenna unit comprising a plurality of microstrip patch unit cells provided on the second surface and the third surface with respect to a ground plane provided on the first surface;
- a patch unit comprising a plurality of unit cells provided along outer edges of the upper glass sheet and the lower glass sheet; and
- an element unit provided at an inner side of the patch unit.

2. The laminated glass antenna structure according to claim 1, wherein the element unit comprises:
- a first feeding line provided in a widthwise direction of the upper glass sheet;
- a second feeding line provided between the first feeding line and a feeding portion; and
- radiation elements each spaced apart from the first feeding line to have predetermined gaps therebetween.

3. The laminated glass antenna structure according to claim 2, wherein the radiation elements are positioned at upper and lower ends with respect to the first feeding line and have regular intervals therebetween.

4. The laminated glass antenna structure according to claim 3, wherein the radiation elements positioned at one end with respect to the first feeding line each have an interval from a radiation element adjacent thereto that is identical to a wavelength of a corresponding frequency.

5. The laminated glass antenna structure according to claim 2, wherein the first feeding line and the radiation elements have a gap therebetween of 0.05 wavelength or less of a corresponding frequency.

6. The laminated glass antenna structure according to claim 2, wherein:

the radiation elements have a length of 0.4 to 0.6 wavelength of a corresponding frequency, and the radiation elements have a width of 0.1 wavelength or less of a corresponding frequency.

7. A laminated glass antenna structure comprising:

a lower glass sheet comprising a first surface facing inside and a second surface at an upper end thereof;

an upper glass sheet comprising a third surface adjacent to the lower glass sheet;

an adhesive film positioned between the upper glass sheet and the lower glass sheet; and an antenna unit comprising a plurality of microstrip patch unit cells provided on the second surface and the third surface with respect to a ground plane provided on the first surface, wherein a microstrip patch unit cell of the plurality of microstrip patch unit cells printed on the third surface comprises:

a first patch body having a square shape located at a central portion of the antenna unit; and two first extensions spaced apart from each other and extending outwardly from every one of four sides of the first patch body.

8. The laminated glass antenna structure according to claim 7, wherein a microstrip patch unit cell of the plurality of microstrip patch unit cells printed on the second surface comprises:

a second patch body having a shape corresponding to the first patch body;

second extensions each extending from a corresponding side of the second patch body, and corresponding to a gap between the two first extensions positioned on one side of the first patch body; and third extensions each corresponding to a position between two adjacent first extensions each extending from a corresponding one of two adjacent sides of the first patch body.

9. The laminated glass antenna structure according to claim 1, wherein each microstrip patch unit cell has a square shape with one side having a length of 1.4 to 1.6 millimeters (mm).

10. The laminated glass antenna structure according to claim 7, wherein a gap between the two first extensions on one side of the first patch body is 0.1 times a length of one side of the microstrip patch unit cell.

11. The laminated glass antenna structure according to claim 7, wherein the first patch body has one side having a length that is 0.46 times a length of one side of the microstrip patch unit cell.

12. The laminated glass antenna structure according to claim 7, wherein each first extension has a thickness that is 0.13 times a length of one side of the microstrip patch unit cell.

13. The laminated glass antenna structure according to claim 7, wherein a distance between an end of each first extension and an end of the microstrip patch unit cell adjacent thereto is 0.03 times a length of one side of the microstrip patch unit cell.

14. The laminated glass antenna structure according to claim 8, wherein each second extension has a thickness equal to the gap between the two first extensions provided on one side of the first patch body.

15. The laminated glass antenna structure according to claim 8, wherein a gap between each second extension and each third extension adjacent thereto is equal to a thickness of each first extension.

16. The laminated glass antenna structure according to claim 8, wherein each third extension has one side having a length that is 0.26 times the length of one side of the microstrip patch unit cell.

17. The laminated glass antenna structure according to claim 1, wherein the plurality of microstrip patch unit cells has an electromagnetic band gap (EBG) structure.

* * * * *